(12) United States Patent
Hungarter

(10) Patent No.: US 6,511,741 B1
(45) Date of Patent: Jan. 28, 2003

(54) ROOFING TAPE

(76) Inventor: Ronald C. Hungarter, 127 Second Ave., Kingston, PA (US) 18704

( * ) Notice: Subject to any disclaimer, the term of this patent is extended or adjusted under 35 U.S.C. 154(b) by 0 days.

(21) Appl. No.: 08/625,558

(22) Filed: Apr. 1, 1996

Related U.S. Application Data

(63) Continuation-in-part of application No. 08/410,987, filed on Mar. 27, 1995, now abandoned.

(51) Int. Cl.[7] ................................................. B32B 7/12
(52) U.S. Cl. ...................................................... 428/343
(58) Field of Search ........................................ 128/343

(56) References Cited

U.S. PATENT DOCUMENTS

| | | | | |
|---|---|---|---|---|
| 308,574 | A | * | 11/1884 | Poe |
| 2,187,087 | A | * | 1/1940 | Leary |
| 4,845,858 | A | * | 7/1989 | Thomas |
| 4,942,670 | A | * | 7/1990 | Brandt |
| 4,970,797 | A | * | 11/1990 | Sarasin |
| 5,012,590 | A | * | 5/1991 | Wagner et al. |
| 5,056,234 | A | * | 10/1991 | Han |

* cited by examiner

*Primary Examiner*—Cheryl A Juska
*Assistant Examiner*—Lynda Salvatore

(74) *Attorney, Agent, or Firm*—Baker Botts LLP

(57) ABSTRACT

The present invention relates to a roofing tape which allows roofers to determine and consistently apply the proper reveal space of shingles on any roof without measurement. A roofing tape includes a start indicator, a first line indicator, and a plurality of series of indicia on its front surface. The first line indicator is located at a distance from the start indicator equal to the height of the roofing shingles less the overhang requirement of the roofing shingles. Each series of indicia is arranged longitudinally along the roofing tape. Each series of indicia has equal intervals between the first line indicator and the first indicator in the series and between consecutive indicia in the series. The intervals in each series correspond to a spacing within the reveal space tolerance range of the roofing shingles. The roofing tape preferably includes eave adjustment eave adjustment hash marks so that the tape may be adjusted downward to cover all the areas along an irregular eave. The roofing tape preferably includes an applicator which helps extend the tape along the roof, aids in selecting the appropriate indicia for the particular roof, and indicates the line where the bottom of the last course of shingles should be laid. The present invention eliminates the need for a roofer to perform measurements and trial and error calculations in determining the correct reveal space for a roof, eliminates the possibility for creep, and facilitates the installation of shingles on uneven and intersecting roofs and roofs with other irregularities.

20 Claims, 6 Drawing Sheets

ROOFING TAPE

This application is a continuation-in-part of U.S. Ser. No. 08/410,987, filed Mar. 27, 1995 now abandoned.

BACKGROUND OF THE INVENTION

The present invention relates to a roofing tape which allows roofers to determine and consistently allow for the proper reveal space of shingles on any roof without measurement. Reveal space is the amount of space on a shingle that remains exposed and is not overlaid by another shingle. Determining the correct amount of reveal space and applying it consistently is important for several reasons. First, laying evenly spaced shingles on a roof achieves an aesthetically pleasing look. Second, if the proper reveal space is chosen and consistently applied, then no row of shingles will have to be cut or excessively overlaid upon another. Moreover, applying an improper reveal space may result in inadequate sealing of the shingles, wind damage to the roof and the loss of the shingle manufacturer's warranty.

The prior art discloses various guides used in the construction field. For example, U.S. Pat. No. 2,187,087 (Leary), U.S. Pat. No. 4,845,858 (Thomas), U.S. Pat. No. 4,942,670 (Brandt), and U.S. Pat. No. 5,012,590 (Wagner) disclose the use of a tape guide to position studs or beams. U.S. Pat. No. 4,970,797 (Sarasin) discloses the use of a mason's scale for laying courses of bricks U.S. Pat. No. 308,574 (Poe) discloses the use of a shingling gage to help a roofer lay shingle. Finally, U.S. Pat. No. 5,056,234 (Han) discloses a tape guide to assist in laying roof tiles.

Han discloses a device for use in laying out courses of tiles of various sizes made by various manufacturers. Specifically, a non-disposable tape is disclosed having coded indicia which, when extended along a roof from the eave, identify the roof course lines for tiles of particular manufacturers. Each series of spaced indicia apply to a specific manufacturer's tile type allowing for a three (3) inch overlap and are selected before the tape is extended on the roof. The tile roofing industry is uniquely concerned with maintaining the consistent constant overlap of the tiles so that proper runoff is achieved. Lines are drawn along the roof at the indicia points as the tape is extended, the tape is removed from the roof, and the tiles are laid according to the course lines. A procedure for addressing the last course of tiles toward the peak of the roof is not disclosed, however, and application to other than simple gable roofs is not indicated. Thus, Han discloses an apparatus for assisting in laying tile according to the tile type and tile overlap requirements on simple even roofs.

To date, none of the prior art has addressed the problem a roofer faces in determining the correct amount of reveal space for installing shingles on a roof. Typically, the roofer must measure the roof, from eave to peak, and then calculate the optimal spacing within the reveal space tolerance range that will provide the best fit for the rows of shingles for that size roof. This method is time-consuming and subject to various inaccuracies. For example, the calculations usually are performed by trial and error and involve fractions. Moreover, once the calculations are performed, the roofer must then make many individual measurements on each end of the roof. Often, the result of making these numerous measurements is that parallax, also known as "creep," occurs. This is when small errors in individual measurements accumulate and are magnified by the time the roofer installs the last row of shingles. Furthermore, the calculations become very difficult on uneven and intersecting roofs and roofs with other irregularities, such as dormers.

Although the Han roofing tile course marking device provides assistance in the laying of tile on simple gable roofs, as explained above, it does not totally eliminate measuring from this task since treatment of the top row of tiles is not addressed. Furthermore, complex intersecting and uneven roofs would require complex adaptation of the Han system and would entail substantial measurement and cutting of tile at the site.

Finally, another problem faced in shingle roofing is that older homes often have irregular eaves so that when a straight line of shingles is laid, the wavy area of the eave may not be covered by the shingles. For the foregoing reasons, there is a need for a device that eliminates the need for a roofer to perform measurements and trial and error calculations in determining the correct reveal space for a roof, that eliminates the possibility for creep, and that facilitates the installation of shingles on uneven and intersecting roofs and roofs with other irregularities, such as dormers.

SUMMARY OF THE INVENTION

The present invention is directed to a roofing tape that satisfies these needs. A roofing tape includes a tape having a start indicator, a first line indicator, and a plurality of series of indicia on its front surface. The first line indicator is located at a distance from the start indicator equal to the height of the roofing shingles less the overhang requirement of the roofing shingles. Each series of indicia is arranged longitudinally along the roofing tape. Each series of indicia has equal intervals between the first line indicator and the first indicator in the series and between consecutive indicia in the series. The intervals in each series correspond to a spacing within the industry's reveal space tolerance range of the roofing shingles.

The roofing tape preferably includes eave adjustment hash marks so that the tape may be adjusted downward to cover all the areas along an irregular eave.

The roofing tape also preferably includes an applicator which is clipped onto or otherwise attached to a spool about which the tape is wound. The applicator permits the easy extension and application of the tape onto the roof. The applicator also serves to choose the applicable indicia and to indicate the bottom of the next course of shingles to be laid, even once the tape has been covered by the previous course.

To use the roofing tape, a roofer aligns the start indicator or one of the eave adjustment hash marks, if necessary, with the eave of a roof and runs the tape to the peak of the roof holding the applicator to do so and hanging the spool and applicator over the other side of the peak. The indicator closest to the peak of the roof indicates the series of indicia with the correct reveal space interval for that roof. A preferable method of choosing the appropriate indicia entails holding the applicator so that the spool is at the peak and pivoting the handle of the applicator about the spool back down onto the roof, or disconnecting the applicator from the spool and placing it on the roof with its spool connecting end pointing toward and aligned with the peak, so that the selector of the applicator is aligned with or in close proximity to an indicator on the tape. This indicator is alternatively chosen for placement of the shingles. By laying out at least two roofing tapes on each end of the roof, the roofer can mark chalk lines between the indicia in the proper series on each tape. The roofer then applies the shingles on the roof from eave to peak directly over the tape according to the selected indicia. Finally, the applicator is again used at the peak to indicate the placement of the last one or two courses of shingles before the roof cap.

A roofing tape system including the roofing tape, spool and applicator provide for the most simple installation of roofing shingles on, even on the most complex of roofs, so that measurements are virtually eliminated.

BRIEF DESCRIPTION OF THE DRAWINGS

Further objects and advantages of the invention will be apparent from the following description of representative embodiments thereof, taken in conjunction with the accompanying drawings, in which.

DETAILED DESCRIPTION OF PREFERRED EMBODIMENTS

Figure 1:
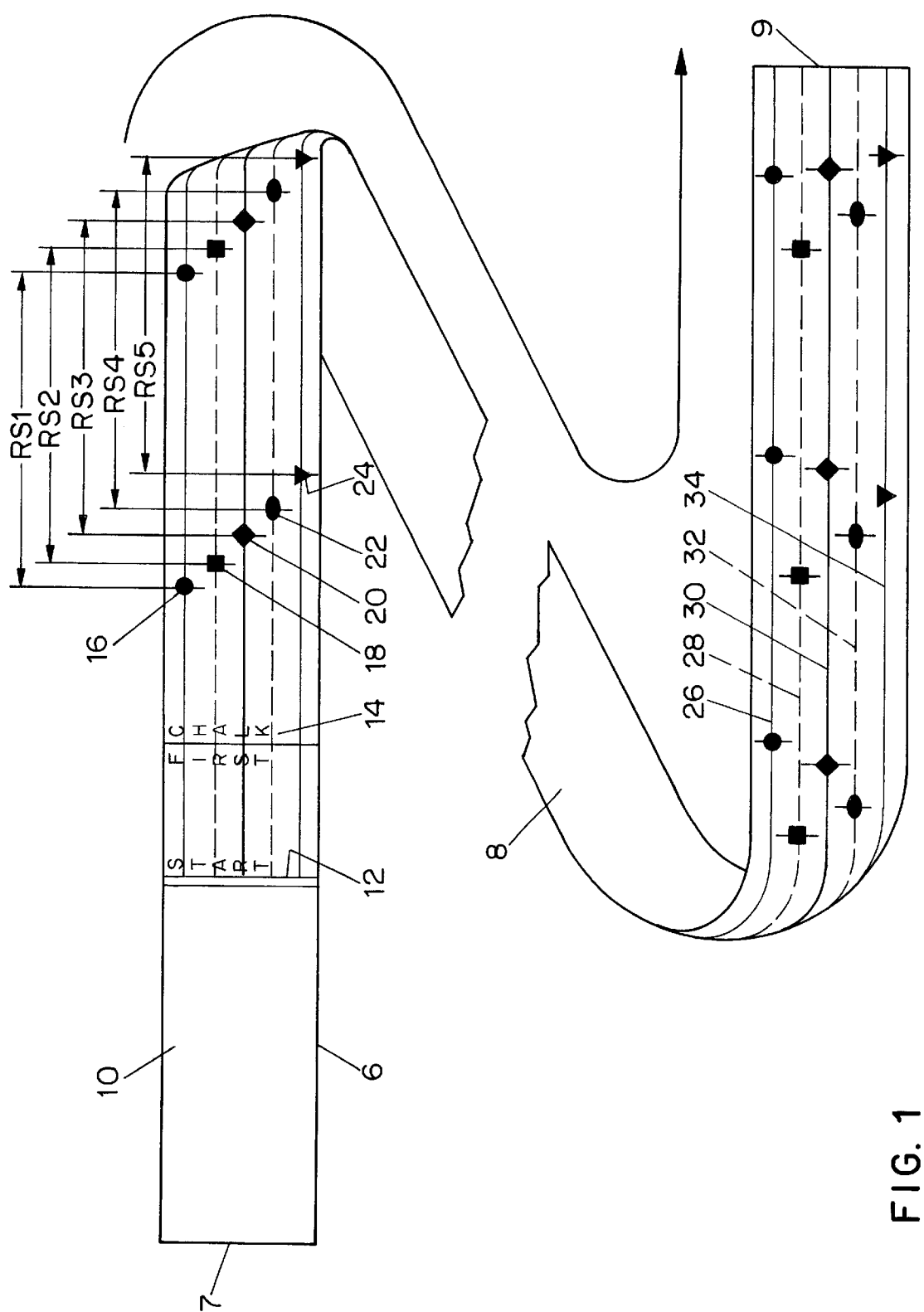
FIG. 1 is a perspective view of a preferred embodiment of the tape of the invention.
Figure 2:
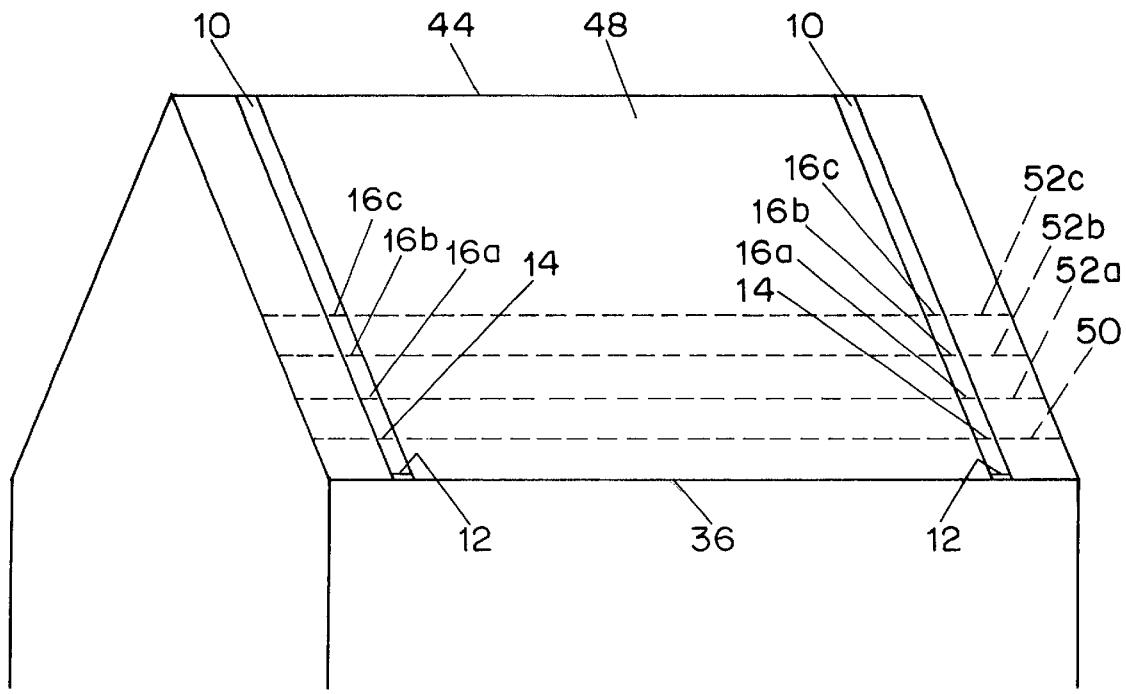
FIG. 2 is a perspective view of a preferred embodiment of the invention in use on a roof.

As shown in FIGS. 1–5, one preferred embodiment of the roofing tape, indicated generally at 6, includes a front surface 10, a reverse surface 8, a first edge 7, and a second edge 9. The front surface 10 has a start indicator 12 and a first line indicator 14. The start indicator 12 is located at a preselected distance (preferably greater than zero) from the first edge of the tape 7 and is used to align the roofing tape with the eave 36 of the roof. The first line indicator 14, which indicates the position of the top of the first row of shingles, is located between the start indicator 12 and the second edge 9. The distance between the first line indicator 14 and the start indicator 12 is equal to the height of the roofing shingles less their overhang requirement.

For example, for U.S. industry standard roofing shingles with a height of 12 inches and an overhang requirement of ⅜ inch, the first line indicator 14 would be located a distance of 11-⅝ inches from the start indicator 12. As a further example, for slateline shingles with a height of 17 inches and a ⅜ overhang requirement, the first line indicator 14 would be located a distance of 16-⅝ inches from the start indicator 12. Although U.S. standards are used in this application to illustrate the invention, other standards are fully applicable, including any metric conversions thereof.

The front surface 10 also has a plurality of series of indicia. In the embodiments of FIGS. 1–5, five series are shown: a series of first indicia 16, a series of second indicia 18, a series of third indicia 20, a series of fourth indicia 22, and a series of fifth indicia 24. Each series of indicia are arranged longitudinally along the tape from the first line indicator 14 to the second edge 9. The intervals between the first line indicator 14 and the first indicator in each series and between consecutive indicia in each series are equal. In FIG. 1, these intervals are shown as RS1, RS2, RS3, RS4, and RS5, respectively, for the series of first indicia 16, the series of second indicia 18, the series of third indicia 20, the series of fourth indicia 22, and the series of fifth indicia 24. The intervals RS1, RS2, RS3, RS4, and RS5 correspond to different spacings within the reveal space tolerance range for roofing shingles. For example, for standard roofing shingles with a nominal reveal space requirement of 5 inches, the tolerance range is usually 4-¾ inches to 5-¼ inches. In that case, RS1, RS2, RS3, RS4, and RS5 preferably would be 4-¾ inches, 4-⅞ inches, 5 inches, 5-⅛ inches, and 5-¼ inches, respectively. For slateline roofing shingles with a nominal reveal space requirement of 7-½ inches and a tolerance range of 7-¼ inches to 7-¾ inches, RS1, RS2, RS3, RS4, and RS5 preferably would be 7-¼ inches, 7-⅜ inches, 7-½ inches, 7-⅝ inches, and 7-¾ inches, respectively.

As shown in FIG. 1, in one embodiment, the front surface 10 also has reference lines 26, 28, 30, 32, and 34 running longitudinally along the roofing tape 10, which assist in identifying the series of indicia. FIGS. 1–5 show the indicia 16, 18, 20, 22, and 24 as icons. Although not shown, alternate embodiments may include indicia that are letters, numbers or the like.

Figure 6:
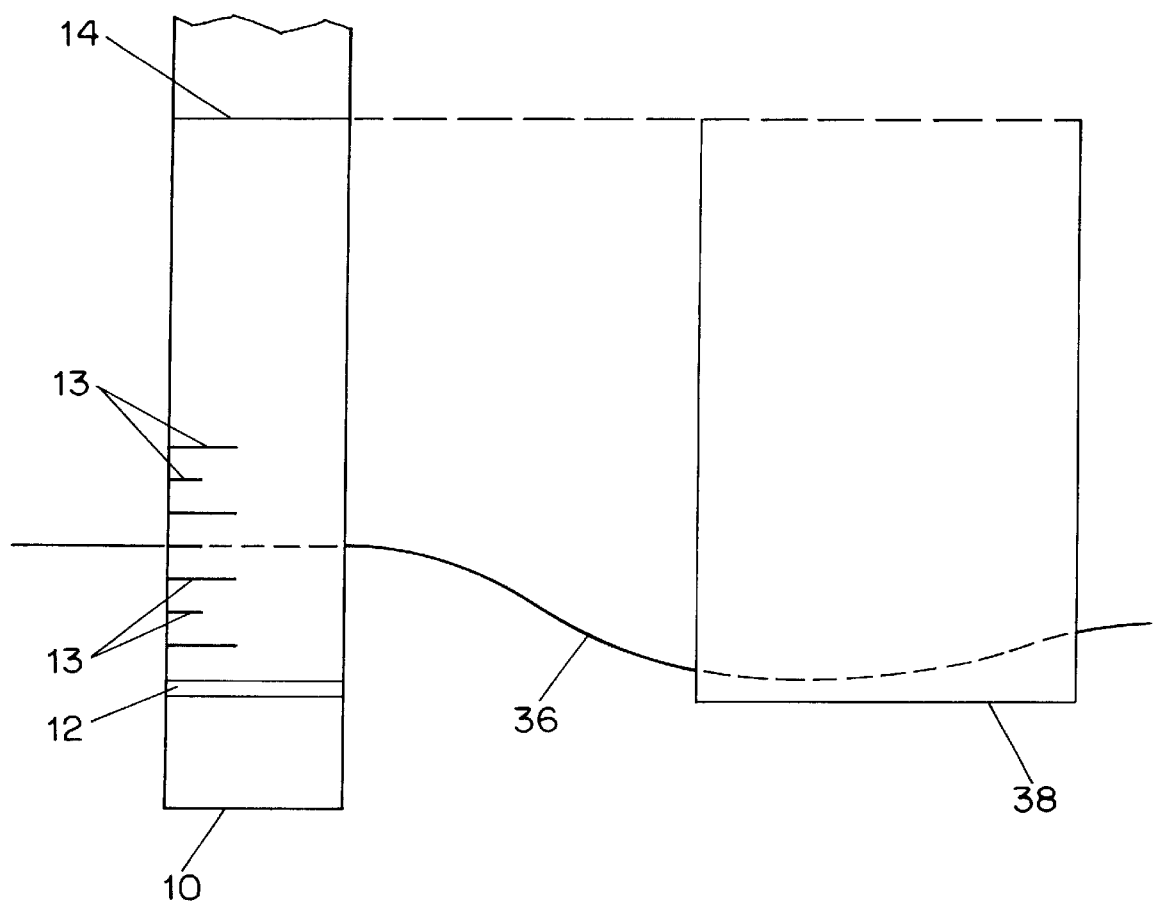
FIG. 6 is a view of another preferred embodiment of the invention with the eave adjustment hash marks in use on a roof.

To allow for eaves that are uneven or irregular due to previous poor workmanship, weather or age, the roofing tape 6 preferably includes eave adjustment hash marks 13, as shown in FIG. 6. The hash marks allow the roofer to simply and accurately adjust the tape downward so that the first course of shingle 38 will fully cover the eave 36 of the roof. The hash marks 13 are in the form of short and long lines so that roofers may easily coordinate their multiple tape adjustments along the roof, e.g. by stating, "Move the tape down to the second short line from the double hash mark." In essence, the hash marks 13 become an alternative start indicator 12 and the first indicator 14 is automatically adjusted accordingly.

Preferably, the roofing tape 6 is made from a polyolefin weather-resistant, non-stretchable material. In addition, the reverse surface 8 may be provided with a pressure-sensitive, thermally diverse adhesive layer to facilitate retention of the roofing tape 6 against the roof 48. Alternatively, the roofing tape 6 may be affixed to the roof by staples or nails. Due to its composition, the roofing tape 6 may be applied to a roof on which an ice and water shield, such as WinterGuard, has been previously applied. The markings on the roofing tape 6 will remain visible for days in this environment, as opposed to manual markings made on the roof itself which will disappear in a relatively short period of time and will "melt" off from exposure to the sun.

Figure 7:
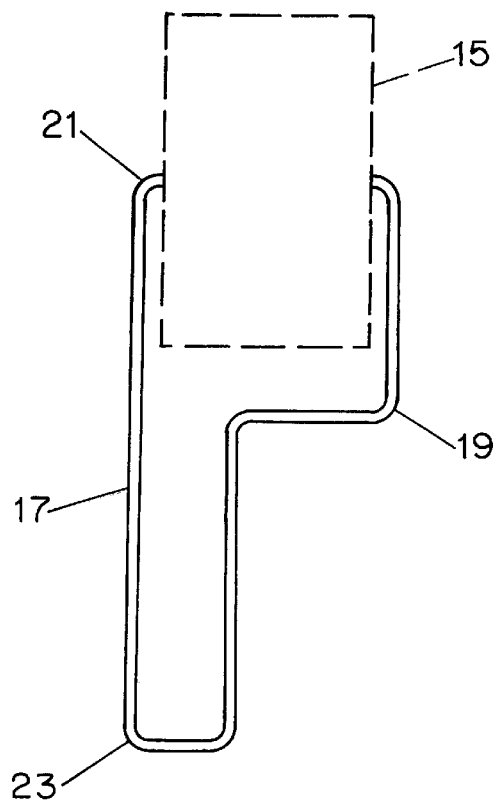
FIG. 7 is an illustration of an applicator in another preferred embodiment of the invention.

Preferably, the roofing tape 6 is wound onto a spool 15 as shown in FIG. 7. An applicator 17 is clipped onto or attached to the spool at a spool connecting end 21 so that the applicator 17 may be pivoted about the spool 15. Applicator 17 allows a roofer to easily apply the roofing tape 6 onto the roof by holding the portion of the applicator 17 toward the handle end 23.

Figure 3:
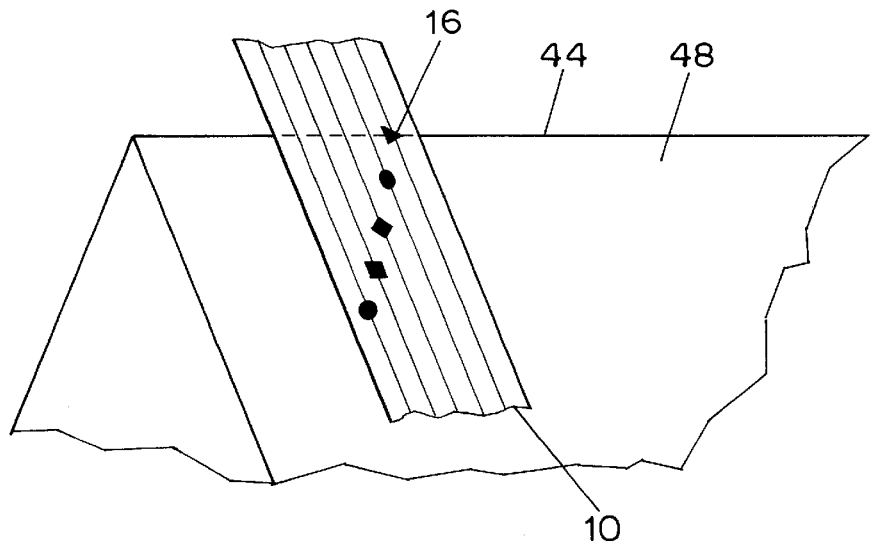
FIG. 3 is a perspective view of a preferred embodiment of the invention in use on the peak of a roof.
Figure 4:
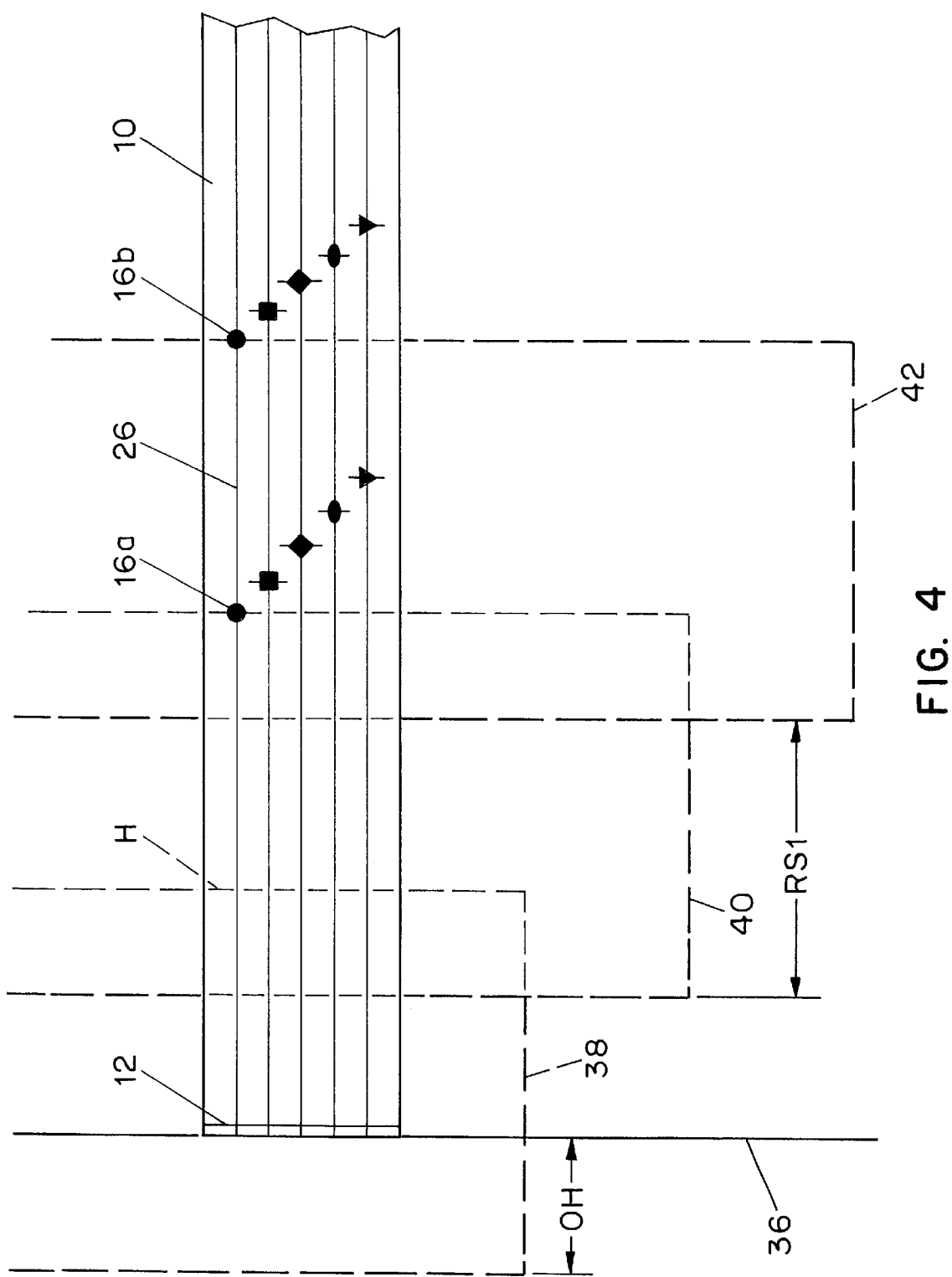
FIG. 4 is a top plan view of a preferred embodiment of the invention in use on the eave of the roof.

The roofing tape 6 may be used on even roofs (roofs with equal heights at the two ends), uneven roofs (roofs with unequal heights at the two ends), and intersecting roofs. To install shingles using the roofing tape 6 on an even roof, beginning on one end of the roof, a roofer places the reverse surface 8 of the roofing tape 6 against the roof 48 while aligning the start indicator 12 with the eave 36 of the roof. Alternatively, if the eave 36 is irregular or warped due to previous poor workmanship, age or weathering, the roofing tape 6 is adjusted downward so that one of the eave adjustment hash marks is aligned with the eave 36. The roofer then guides the roofing tape 6 perpendicularly to and from the eave 36 up to the peak 44 of the roof, preferably utilizing applicator 17 to do so. Once the roofing tape 6 has reached the peak 44 of the roof, the roofer checks to see which of the indicia is closest to the peak. In FIG. 3, for example, the roofer would choose first indicia 16.

Alternatively, the indicia are, preferably, selected by utilizing the applicator 17. Applicator 17 is dimensioned according to the shingle type to be installed to permit the roofer to identify the bottom of any shingle course along the roof. Specifically, the length of applicator 17 is predetermined to fall within the reveal space tolerance of the particular shingle type. To illustrate, for a standard twelve (12) inch roofing shingle with a nominal reveal space requirement of 5 inches, applicator 17 is five inches from the spool connecting end 21 to the handle end 23. Applicator 17 preferably includes a selector 19 located between the spool connecting end and the handle end as shown in FIG. 7. Selector 19 may be in the form of an edge, as in FIG. 7., or it may take some other practical form such as a notch.

Figure 8:
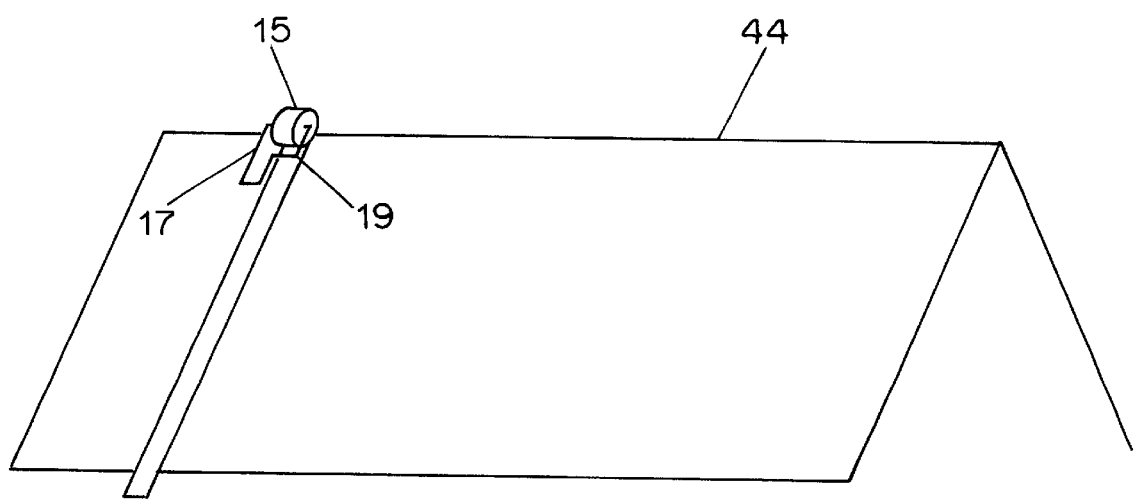
FIG. 8 is a view of the applicator being used to choose the indicia or to indicate the last course of shingle according to the invention.

For a standard twelve (12) inch roofing shingle with a nominal reveal space requirement of 5 inches, selector 19 is located two (2) inches from the spool connecting end 21 and three (3) inches from the handle end 23. For a seventeen (17) inch slateline roofing shingle with a nominal reveal space requirement of 7-½ inches, selector 19 is located two (2) inches from the spool connecting end 21 and 5-½ inches from the handle end 23. FIG. 8 illustrates use of applicator 17 to select the appropriate indicia for a given roof section. Once the roofing tape 6 is extended to the peak 44 of the roof so that the spool connecting end 21 of the applicator 17 is aligned with the peak, applicator 17 is pivoted about the spool back onto the roof, or removed from the spool and placed on the roof with the spool connecting end pointing toward and aligned with the peak 44. With the applicator held in this position, the indicator on the tape closest to the selector 19 is chosen. Choosing the indicia in this manner eliminates the wasting of materials and saves man hours. For instance, choosing a different icon within manufacturers specifications may prevent having to cut and use a small last course of shingles, thus saving time and material.

After the roofer has completed this procedure for one end of the roof, the roofer repeats this procedure for the other end with a second roofing tape. At this point, the roofer is ready to mark chalk lines, now described with reference to FIG. 2. First, the roofer marks a chalk line 50 across the first line indicators 14 of the two tapes. The roofer then moves the chalk line up to the first occurrences of the chosen indicia (in this case, first indicia 16a) on each of the two tapes and marks a second chalk line 52a. The roofer follows this same procedure for the subsequent occurrences of the chosen indicia on each of the two tapes until he reaches the peak of the roof. At this point, the roofer has laid out all the chalk lines that are needed to install the shingles. All that remains to be done is to align the top of each row of shingles with the chalk lines.

Preferably, applicator 17 is used to indicate the bottom of the last one or two courses of shingles before applying the roof cap. Because the shingle courses cover the tape toward the peak of the roof so that the last one or two courses do not have visible indicia to guide their installation, applicator 17 is used to properly space these last courses. In a similar manner as that described above for choosing indicia, applicator 17, still attached to the now shingled-over tape 6, is pivoted about the spool back over onto the roof. Alternatively, applicator 17 is removed from the spool. In either case, applicator 17 is placed on the roof so that the handle end 23 is aligned with the bottom of the last laid course of shingles. When placed in such a manner, the spool connecting end 21 of applicator 17 indicates the course line for the bottom of the next line of shingles to be laid, so that no measurement is necessary. This procedure is repeated, if necessary, for the last course of shingles.

The applicator 17 may be used to indicate the bottom of the next course of shingles where the tape is still visible as well. In this instance, the applicator 17 is similarly placed on the roof with the handle end 23 now aligned with one of the chosen indicia. Here, the bottom of the next course of shingles is indicated by the selector 19. Thus, the applicator serves several possible functions.

With slight modifications to the basic procedure for using the roofing tape on even roofs, the roofing tape may easily be used on uneven and intersecting roofs. On uneven roofs, as with even roofs, the roofer places tapes on both ends of the roof and checks to see which indicia on each tape is closest to the peak of the roof, or, preferably, by using the applicator 17 as described above. In this case, the chosen indicia for the tape on one end of the roof may be different than the chosen indicia for the second tape on the other end of the roof. To mark chalk lines, the roofer pulls the chalk line across the indicia chosen from the tape on the shorter end of the roof. At a point on the longer end of the roof, four or five courses short of the peak, another tape is extended from the location of the last used indicator on the tape to the peak. Another indicator is chosen and used for the last portion of the roof so that, to the naked eye, the shingle lines are aligned for the entire roof.

The roofing tape actually may be extended along any roof portion, thereby choosing an icon, and picked up at another roof portion using the above method of starting at a last used indicator. Dormers, skylights and other obstructions to the normal roof line require this treatment of the roof line as separate roof portions. The roofing tape 6 provides course lines that are aligned to the naked eye even in these instances.

Figure 5:
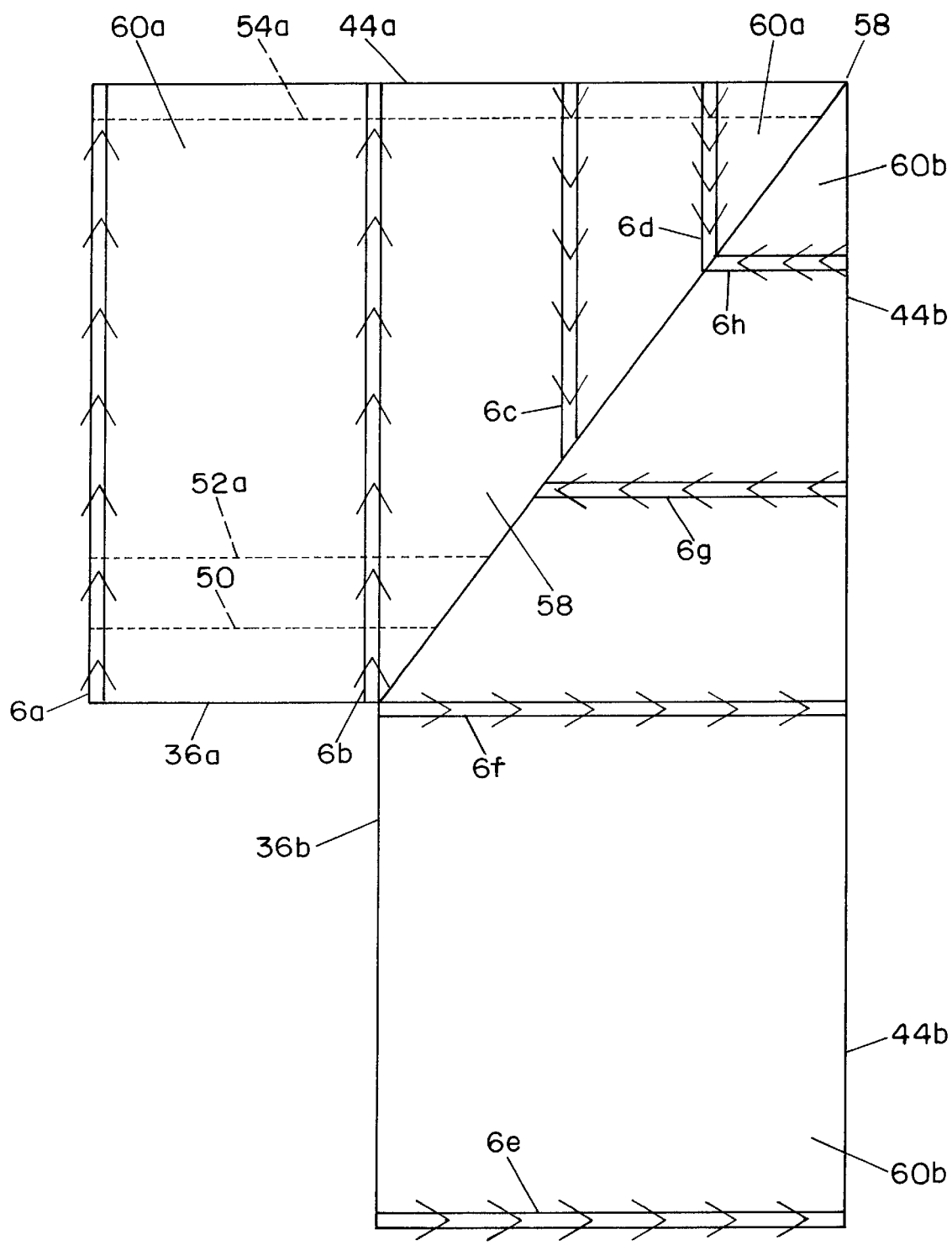
FIG. 5 is a top plan view of a preferred embodiment of the invention in use on an intersecting roof.

As shown in FIG. 5, to use the roofing tape on an intersecting roof, the roofer places a first main roofing tape 6a on the non-intersecting end of the roof and a second main roofing tape 6b at the location where intersection 58 of the roof crosses the eave 36a of the roof. Depending on whether the intersecting roof is even or uneven, the roofer follows the procedures for selecting indicia and marking chalk lines as previously described for those types of roofs.

In addition to the two main roofing tapes, 6a and 6b, on an even, intersecting roof, the roofer may also install auxiliary roofing tapes in the valley area of the intersecting roof to assist in marking chalk lines in this area. The valley area for an intersecting roof 60a is the area between the intersection 58 and the second main roofing tape 6b. To place an auxiliary roofing tape in the valley area of an intersecting roof, the roofer first chooses a corresponding set of indicia located near the peak 44a of the roof from the selected series of indicia on the first main roofing tape 6a and the second main roofing tape 6b. The roofer then marks a reference chalk line 54a between this set of corresponding indicia. Next, using the series of indicia on an auxiliary roofing tape 4c that corresponds to the selected series of indicia on the first and second main roofing tapes 6a and 6b, the roofer chooses an indicator from within the series to operate as a reference indicator. The roofer aligns this reference indicator with a position on the reference chalk line 54a within the valley area. Then, the roofer guides the auxiliary roofing tape 6c perpendicularly to the reference chalk line 54a down to the intersection 58 of the roof. Once the auxiliary roofing tape 4c is in place, the roofer marks a chalk line between each indicator in the selected series of indicia on the second main roofing tape 6b and the selected series of indicia on the auxiliary roofing tape 4c with the corresponding sequential occurrence within each of the series as measured from the reference chalk line 54a. The roofer may repeat this procedure for the placement of other auxiliary roofing tapes in the valley area.

The previously described embodiments of the present invention have many advantages. The roofing tape eliminates the need for the roofer to perform any calculations. The roofer simply needs to properly align the tape with the roof, using the eave adjustment hash marks as needed, and choose the appropriate series of indicia to use by reading the tape at the peak or, preferably, by using the applicator as described above. Additionally, once the appropriate series of indicia is chosen, the roofer does not need to perform any measurements. The roofer simply uses the indicia on the roofing tapes as guides to mark chalk lines for laying the shingle courses using the applicator to lay the last one or two courses before the roof cap is installed. This procedure eliminates the possibility of creep associated with a roofer performing many individual measurements on each end of the roof. Finally, the roofing tape provides these same benefits on uneven and intersecting roofs as well as on even roofs and provides aligned shingle course lines around such obstructions as skylights and dormers.

Although the invention has been described and illustrated herein by reference to representative embodiments thereof, it will be understood that such embodiments are susceptible of variation and modification without departing from the inventive concepts disclosed. All such variations and modifications, therefore, are intended to be included within the spirit and scope of the appended claims.

I claim:

1. A roofing tape for assisting in the installation of a plurality of a selected roofing shingle to a roof section having a length, the selected roofing shingle having a height, an overhang requirement, a reveal space and a reveal space tolerance range, the roofing tape comprising:
   (a) a front surface;
   (b) a reverse surface;
   (c) a first edge;
   (d) a second edge;
   (e) a start indicator on the front surface located at a preselected distance from the first edge;
   (f) a first line indicator on the front surface located between the start indicator and the second edge at a distance from the start indicator equal to the height of the roofing shingles less the overhang requirement of the roofing shingles; and
   (g) a plurality of series of indicia on the front surface, each series of indicia being arranged longitudinally with consecutive series being separated by a first interval substantially corresponding to the reveal space of the selected shingle and consecutive indicia within each of said plurality of series being separated by a second interval, a spacing from a first indicia to a last indicia in each series of indicia corresponding to the reveal space tolerance range of the selected roofing shingle;
   wherein the plurality of series of indicia are positioned on the front surface to facilitate the selection of one of the indicia in said series corresponding to the length of the roof section.

2. The roofing tape of claim 1 applied to a roof section having a length measured from eave to peak.

3. The roofing tape of claim 1 further comprising a weather resistant, non-stretchable material.

4. The roofing tape of claim 1 further comprising a flexible, disposable material.

5. The roofing tape of claim 1 in which the reverse surface contains a self-adhesive layer disposed thereupon.

6. The roofing tape of claim 1 in which the series of indicia are arranged longitudinally from the first line indicator to the second edge.

7. The roofing tape of claim 1 in which each series of indicia contains a reference line arranged longitudinally from the first edge to the second edge.

8. The roofing tape of claim 1 in which the indicia are icons.

9. The roofing tape of claim 1 in which the indicia are letters.

10. The roofing tape of claim 1 in which the indicia are numbers.

11. The roofing tape of claim 1 further comprising a plurality of eave adjustment hash marks on the front surface between the start indicator and the second edge.

12. The roofing tape of claim 11 wherein the eave adjustment hash marks are substantially adjacent and parallel to the start indicator.

13. The roofing tape of claim 11 wherein the eave adjustment hash marks comprise alternate relatively short and relatively long lines beginning at a side of the first surface and extending toward the other side of the first surface.

14. A roofing tape system for assisting in the installation of a plurality of a selected roofing shingle to a roof section having a length, the selected roofing shingle having a height, an overhang requirement, a reveal space and a reveal space tolerance range, the roofing tape system comprising:
   (a) a front surface;
   (b) a reverse surface;
   (c) a first edge;
   (d) a second edge;
   (e) a start indicator on the front surface located at a preselected distance from the first edge;
   (f) a first line indicator on the front surface located between the start indicator and the second edge at a distance from the start indicator equal to the height of the roofing shingles less the overhang requirement of the roofing shingles; and
   (g) a plurality of series of indicia on the front surface, each series of indicia being arranged longitudinally with consecutive series being separated by a first interval substantially corresponding to the reveal space of the selected shingle and consecutive indicia within each of said plurality of series being substantially equally separated by a second interval, a spacing from a first indicia to a last indicia in each series of indicia corresponding to the reveal space tolerance range of the selected roofing shingle shingles, the plurality of series of indicia positioned on the front surface to facilitate the selection of one of the indicia in said series corresponding to the length of the roof section; and
   (h) an applicator attached to the second edge of the roofing tape for applying the tape to the roof section and selecting one of the indicia in said series.

15. The roofing tape system of claim 14 further comprising a spool on which the roofing tape is wound and wherein the applicator is pivotally attached to the spool.

16. The roofing tape system of claim 15 wherein the applicator comprises:
- a spool connecting end to which the spool is pivotally attached;
- a handle end spaced a predetermined distance form the spool connecting end, said predetermined distance being within the reveal space tolerance of the selected roofing shingle; and
- a selector located between the spool connecting end and the handle end, said selector positioned to indicate a point on the roofing tape corresponding to a selected indicia when the connecting end faces the peak of the roof.

17. The roofing tape system of claim 16 wherein the selector is located two inches from the spool connecting end of the applicator.

18. The roofing tape system of claim 17 wherein the selector is located three inches from the handle end of the applicator.

19. The roofing tape system of claim 17 wherein the selector is located 5-½ inches from the handle end of the applicator.

20. The roofing tape system of claim 14 wherein the applicator is disposable and comprised of stainless steel.

* * * * *